US012583260B2

(12) United States Patent
Fabing et al.

(10) Patent No.: US 12,583,260 B2
(45) Date of Patent: Mar. 24, 2026

(54) PNEUMATIC TIRE WITH OPTIMIZED CROWN AND BEAD ARCHITECTURES

(71) Applicant: COMPAGNIE GENERALE DES ETABLISSEMENTS MICHELIN, Clermont-Ferrand (FR)

(72) Inventors: Daniel Fabing, Clermont-Ferrand (FR); Patrice Fraysse, Clermont-Ferrand (FR); Alexandre Tobie, Clermont-Ferrand (FR); Francois-Xavier Bruneau, Clermont-Ferrand (FR); Patrick Pallot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 970 days.

(21) Appl. No.: 17/601,625

(22) PCT Filed: Mar. 24, 2020

(86) PCT No.: PCT/EP2020/025141
§ 371 (c)(1),
(2) Date: Oct. 5, 2021

(87) PCT Pub. No.: WO2020/200517
PCT Pub. Date: Oct. 8, 2020

(65) Prior Publication Data
US 2022/0194131 A1 Jun. 23, 2022

(30) Foreign Application Priority Data

Apr. 5, 2019 (FR) ...................................... 1903683

(51) Int. Cl.
B60C 9/28 (2006.01)
B60C 9/20 (2006.01)
(Continued)

(52) U.S. Cl.
CPC .................. B60C 9/28 (2013.01); B60C 9/20 (2013.01); B60C 11/0008 (2013.01);
(Continued)

(58) Field of Classification Search
CPC ........... B60C 15/0009; B60C 15/0018; B60C 15/0081; B60C 15/05; B60C 15/0603;
(Continued)

(56) References Cited

U.S. PATENT DOCUMENTS 11,453,242 B2 9/2022 Abinal et al.
11,560,020 B2 1/2023 Fevrier et al.
(Continued)

FOREIGN PATENT DOCUMENTS

CN 101583503 A 11/2009
EP 1 101 633 A1 * 5/2001
(Continued)

OTHER PUBLICATIONS

English machine translation of JP 2011-31841 A, Feb. 17, 2011.*
(Continued)

*Primary Examiner* — Adrienne C. Johnstone
(74) *Attorney, Agent, or Firm* — VENABLE LLP

(57) ABSTRACT

A tire comprises, in the central part of its crown, at least one undulation (51) of the radially outermost crown layer, having a radial amplitude A at least equal to 1 mm. At least one
(Continued)

bead comprises, aside from the radial carcass layer and the bead wire, a radial reinforcing element that is such that the axial distance between the radial reinforcing element and the axially innermost carcass layer is at least equal to 1 mm and at most equal to 12 mm at the point of the radial reinforcing element that is situated 30 mm from the radially innermost point of the bead wire, for a better trade-off between the stiffness of the undulating crown and of the bead.

11 Claims, 3 Drawing Sheets

(51) Int. Cl.
| | |
|---|---|
| *B60C 11/00* | (2006.01) |
| *B60C 15/00* | (2006.01) |
| *B60C 15/05* | (2006.01) |
| *B60C 15/06* | (2006.01) |

(52) U.S. Cl.
CPC ...... *B60C 15/0009* (2013.01); *B60C 15/0018* (2013.01); *B60C 15/05* (2013.01); *B60C 15/0603* (2013.01); *B60C 15/0607* (2013.01); *B60C 15/0628* (2013.01); *B60C 2009/2012* (2013.01); *B60C 2009/283* (2013.01); *B60C 2011/0033* (2013.01); *B60C 2015/065* (2013.01); *B60C 2015/0667* (2013.01); *B60C 2015/0692* (2013.01); *B60C 2015/0696* (2013.01); *Y10T 152/10504* (2015.01); *Y10T 152/10837* (2015.01)

(58) Field of Classification Search
CPC ......... B60C 15/0607; B60C 2015/0696; Y10T 152/10504
See application file for complete search history.

(56) References Cited

U.S. PATENT DOCUMENTS

| | | |
|---|---|---|
| 2010/0018623 A1 | 1/2010 | Yamaura |
| 2019/0241019 A1 | 8/2019 | Abinal et al. |
| 2019/0248187 A1 | 8/2019 | Abinal et al. |
| 2020/0055344 A1 | 2/2020 | Abinal et al. |
| 2020/0122519 A1 | 4/2020 | Fevrier et al. |
| 2022/0176746 A1 | 6/2022 | Tourneux et al. |
| 2022/0363094 A1 | 11/2022 | Tourneux et al. |

FOREIGN PATENT DOCUMENTS

| | | |
|---|---|---|
| FR | 3057810 A1 | 4/2018 |
| FR | 3057811 A1 | 4/2018 |
| FR | 3057812 A1 | 4/2018 |
| JP | 7-81307 A | 3/1995 |
| JP | 2011-31841 A1 | 2/2011 |
| WO | 2018/011510 A1 | 1/2018 |

OTHER PUBLICATIONS

English machine translation of WO 2018/11510 A1, Jan. 18, 2018.*
English machine translation of EP 1 101 633 A1, May 23, 2001.*
International Search Report dated Jul. 22, 2020, in corresponding PCT/EP2020/025141 (4 pages).

\* cited by examiner

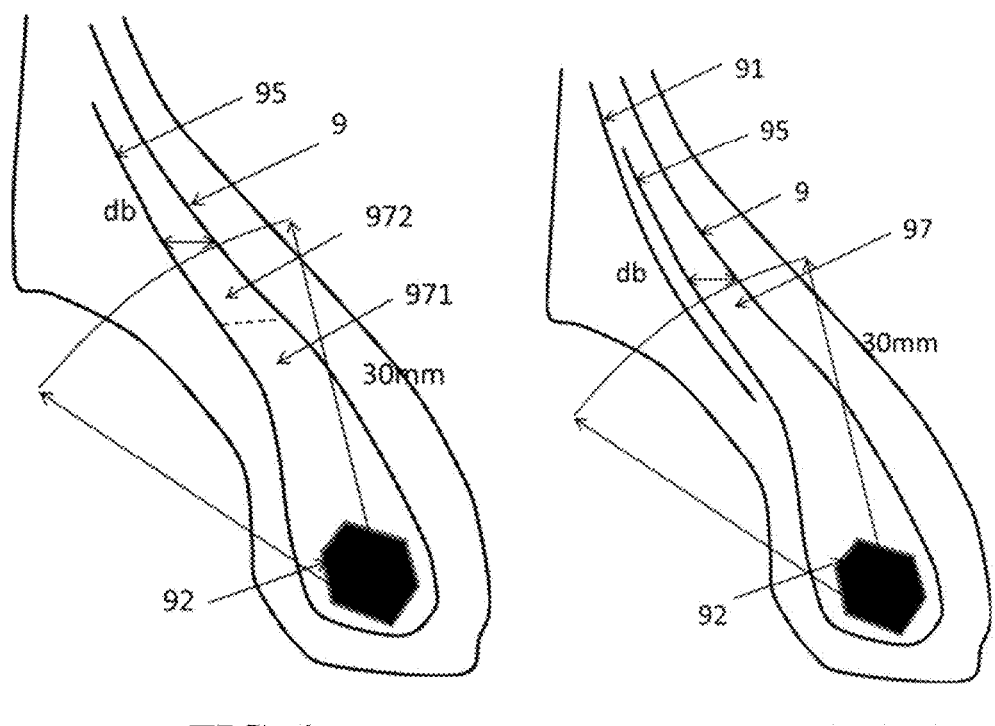
FIG. 4                    FIG. 5
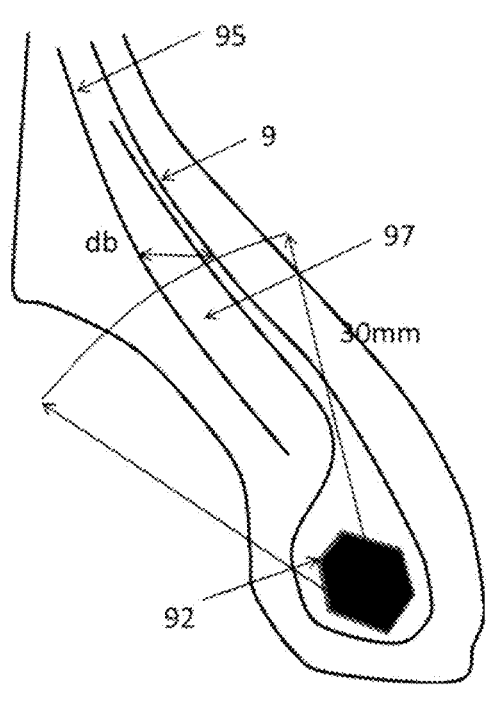
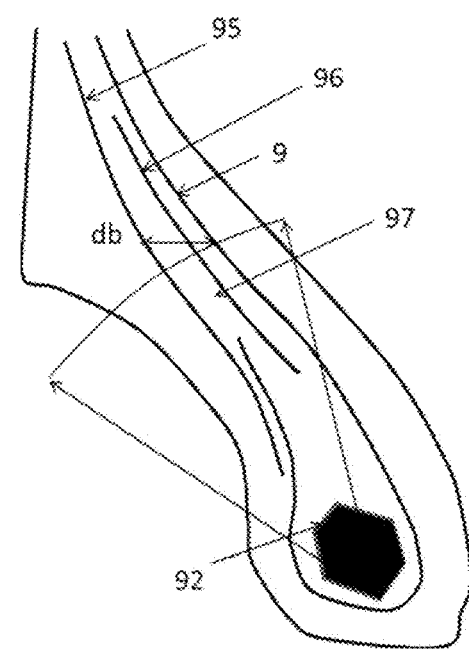
FIG. 6                    FIG. 7

PNEUMATIC TIRE WITH OPTIMIZED CROWN AND BEAD ARCHITECTURES

BACKGROUND

The present invention relates to a tyre intended to be fitted to a vehicle, and more particularly to the crown of such a tyre.

Since a tyre has a geometry exhibiting symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The median circumferential plane referred to as the equatorial plane divides the tyre into two substantially symmetrical half-torus shapes, it being possible for the tyre to exhibit tread or architecture asymmetries that are connected with the manufacturing precision or with the sizing.

In the following text, the expressions "radially on the inside of" and "radially on the outside of" mean "closer to the axis of rotation of the tyre, in the radial direction, than" and "further away from the axis of rotation of the tyre, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tyre and an "axial distance" is a distance with respect to the equatorial plane of the tyre. A "radial thickness" is measured in the radial direction and an "axial width" is measured in the axial direction.

In the following text, the expression "vertically beneath" means "for each meridian, radially on the inside within the boundaries of the axial coordinates delimited by". Thus, "the points of a working layer that are vertically beneath a groove" denote, for each meridian, the collection of points in the working layer that are radially on the inside of the groove within the boundaries of the axial coordinates delimited by the groove.

A tyre comprises a crown comprising a tread that is intended to come into contact with the ground via a tread surface, two beads that are intended to come into contact with a rim, and two sidewalls that connect the crown to the beads. Furthermore, a tyre comprises a carcass reinforcement, comprising at least one carcass layer that is radially on the inside of the crown and connects the two beads. The beads contain circumferential windings of metal wires, referred to as bead wires, configured to hold the tyre on the mounting wheel once the tyre has been mounted on said wheel and inflated.

The crown comprises at least one crown reinforcement radially on the inside of the tread. The crown reinforcement comprises at least one working reinforcement comprising at least one working layer made up of mutually parallel reinforcing elements that form an angle of between 15° and 50° with the circumferential direction. The crown reinforcement may also comprise a hoop reinforcement comprising at least one hooping layer made up of reinforcing elements that form an angle of between 0° and 10° with the circumferential direction, the hoop reinforcement usually, although not necessarily, being radially on the outside of the working layers.

For any layer of reinforcing elements of a crown, working or other reinforcement, a continuous surface, referred to as the radially outer surface (ROS) of said layer, passes through the radially outermost points of each reinforcing element, of each meridian. For any layer of reinforcing elements of a crown, working or other reinforcement, a continuous surface, referred to as the radially inner surface (RIS) of said layer, passes through the radially innermost points of each reinforcing element, of each meridian. The radial distances between a layer of reinforcing elements and any other point are measured from one or the other of these surfaces and in such a way as not to incorporate the radial thickness of said layer. If the other measurement point is radially on the outside of the layer of reinforcing elements, the radial distance is measured from the radially outer surface ROS to this point, and, respectively, from the radially interior surface RIS to the other measurement point if the latter is radially on the inside of the layer of reinforcing elements. This makes it possible to consider radial distances that are coherent from one meridian to the other, without it being necessary to take into account possible local variations associated with the shapes of the cross sections of the reinforcing elements of the layers.

In order to obtain good grip on wet ground, cuts are made in the tread. A cut denotes either a well, or a groove, or a sipe, or a circumferential groove, and forms a space opening onto the tread surface.

A groove has, on the tread surface, two main characteristic dimensions: a width W and a length Lo, such that the length Lo is at least equal to 2 times the width W.

A circumferential groove is a groove with a very great width Ws at least equal to 6 mm, locally making an angle with the circumferential direction that is at most equal to 45° and forming a space that opens onto the entire circumference of the tyre. In numerous variants of pneumatic tyre, the angle formed by the circumferential grooves with respect to the circumferential direction is constant and zero over the entire circumference. In other variants, certain circumferential grooves are continuous series, over the entire circumference, of grooves making different angles, and the continuity of which forms a space that opens onto the entire circumference of the tyre.

The depth of the cut is the maximum radial distance between the tread surface and the bottom of the cut. The maximum value for the depths of the cuts is referred to as the tread depth D.

Depending on their layout, circumferential or transverse, the grooves and the circumferential grooves determine blocks or ribs of rubber material in the tread. A rubber material, a rubber compound refer to an elastic material containing at least one elastomer and at least one filler. A filler rubber contains at least one rubber.

A tyre needs to meet numerous performance criteria relating to phenomena such as wear, grip on various types of ground, rolling resistance, dynamic behaviour, and noise. These performance criteria sometimes lead to solutions that compromise other criteria. Thus, documents FR3057810 and FR3057811 disclose tyres the crown layers of which have undulations. These undulations make it possible to increase the transverse stiffness of the coupling between the crown reinforcement and the tread. According to the materials chosen for the tread, creating undulations in the crown layer makes it possible to improve the performance of the tyre in terms of behaviour by improving its grip, and more particularly its grip on dry ground, and rolling-resistance performance without altering its wearing and crown-durability performance.

The conventional sidewalls and beads of passenger car tyres are not optimized for such crown architectures. Now, the relative stiffnesses of these other two components need to be adapted in order to obtain a tyre that exhibits optimal performance. Beads and sidewalls that have not been optimized flex too much and reduce the maximum improvement in behaviour and in grip according to the improvement targeted using the undulating crown layers technology.

The key objective of the present invention is therefore to improve the trade-off in performance between behaviour and rolling resistance of tyres, more particularly tyres having at least one crown layer with undulations as configured in the prior art, by creating a beam effect in the bead and in the sidewall.

SUMMARY

This objective is achieved by a tyre comprising:
a tread intended to come into contact with the ground via a tread surface, having an axial width L and comprising a tread central part having a width equal to 0.8*L, this central part of the tread comprising at least two circumferential grooves,
a crown reinforcement, radially on the inside of the tread, comprising at least one crown layer, the crown layer or layers being layers of reinforcing elements, the crown reinforcement comprising a working reinforcement comprising at least one working layer, each working layer comprising reinforcing elements which are at least partially metallic, coated with an elastomeric material, parallel to one another and which make, with the circumferential direction (XX') of the tyre, an oriented angle of which the absolute value is at least equal to 15° and at most equal to 50°, each crown layer extending radially from a radially inner surface (RIS) to a radially outer surface (ROS), the radially outermost crown layer vertically beneath the central part of the tread, comprising at least one undulation referred to as central undulation, with a radial amplitude A at least equal to 1 mm, a central undulation of the radially outermost crown layer being such that the portion of the radially outer surface (ROS) of the crown layer of said central undulation is radially on the outside of those points of the radially outermost crown layer vertically beneath the face of the bottom of the circumferential groove closest to said undulation,
two beads (BE, BI) intended to come into contact with a rim and two sidewalls connecting the crown to the beads (BE, BI), each bead (BE, BI) comprising at least one bead wire comprising circumferential metal reinforcing elements,
a carcass layer, radially on the inside of the crown and connecting the two beads (BE, BI), the carcass layer comprising textile reinforcing elements coated in an elastomeric material, which are parallel to one another and make, with the radial direction (ZZ") of the tyre, an angle of which the absolute value is at most equal to 15°,
at least one bead (BE, BI) comprises a radial reinforcing element comprising textile reinforcing elements coated in an elastomeric material, which are parallel to one another and make, with the radial direction (ZZ") of the tyre, an angle of which the absolute value is at most equal to 15°, in said bead (BE, BI) the radially innermost point of the radial reinforcing element being at a radial distance at most equal to 20 mm from the radially innermost point of the bead wire, and in said bead (BE, BI) a point of the radial reinforcing element being radially on the outside of, and at a radial distance at least equal to 40 mm from, the radially innermost point of the bead wire, the axial distance between the radial reinforcing element and the axially innermost carcass layer being at least equal to 1 mm and at most equal to 12 mm at the point of the radial reinforcing element (95) that is situated 30 mm from the radially innermost point of the bead wire.

DETAILED DESCRIPTION

In present-day tyres having crowns of which the crown layers have undulations, there are three possible geometries for the bead wires. In a meridian plane, the bead wires have a polygonal or circular cross section or the bead wires have a multi-linear cross section. In the context of the invention, there is no need to differentiate between bead wires of polygonal cross section and bead wires of circular cross section.

Bead wires of polygonal or circular cross section are made up of metallic elements, individual wires, or strips of individual wires, wound in a contiguous spiral so that the bead wire constitutes a torus of polygonal cross section, the sides of which are of a length that represents several diameters of the elementary metal wires that make up the bead wire. In that case, at least one carcass layer has a main strand and a turned-back strand. The main strand connects the two beads and is axially on the inside of the bead wire, on the radius of said bead wire. A part of the carcass layer is radially on the inside of said bead wire. The turned-back strand is axially on the outside of the bead wire on the radius of said bead wire. The end of the turned-back strand is radially on the outside of the radially outermost point of the bead wire and backs onto the main strand for the points radially on the outside of the bead wire, over a length referred to as the coupling length. In the tyre mounted on a wheel and inflated, the internal pressure of the tyre induces tensile forces on the main strand of the carcass layer which connects the two beads and the points of which have a tendency to move towards higher radius values than the position that they occupy without pressure. This same tension has a tendency to move the turned-back strand towards smaller radius values. These two opposing movements create shear in the compounds between the two strands. In order to ensure the durability of the tyre, there needs to be enough of a coupling length coupling the main strand and the turned-back strand that the shear stresses can be equalized with the tensile force on the carcass layer.

Bead wires with a multi-linear cross section are made up of at least two windings of elementary metal wires substantially parallel to at least one carcass layer. In a meridian section, each of these windings form an alignment substantially parallel to the reinforcing elements of the carcass layer. At least one carcass layer being at least situated between the two spirals of elementary metal wires. In that case, the carcass layer does not have a turned-back strand and its end is radially on the inside of the radially outermost point of the bead wire. In this case, the tensile force is absorbed by the shearing of the rubber compounds situated between the carcass layer and the metal reinforcing elements of the windings.

In both instances, whether the bead wires are of polygonal, circular or multi-linear cross section, in order to obtain a bead and a sidewall of which the stiffness is suited to a crown of which the crown layers have undulations, it is necessary that, in the region in which the bead flexes on the rim flange, the bead should behave like a shell and have an increased bending stiffness. In order to meet this condition, it is enough for a radial reinforcing element to constitute a shell with the radially innermost carcass layer, being distant from said carcass layer by an axial thickness db at least equal to 1 mm, preferably at least equal to 3 mm, and preferably at least equal to 4 mm. The axial distance db is measured in a meridian section from the axially outermost point of the axially innermost carcass layer to the axially innermost point of said radial reinforcing element.

The bending zone is situated approximately 30 mm from the radially innermost point of the bead wire, whatever the geometry thereof.

The invention is not particularly well suited to tyres configured for use in distended mode, namely that can be used with a tyre internal pressure of below 1 bar. This is because such tyres are provided with an inner liner of variable thickness and with this inner liner thickness being high in the sidewall and in the axially outermost point of the tyre. This additional thickness makes the sidewalls radially stiffer but at the expense of the rolling resistance, something which is not the objective of the invention. The tyres according to the invention preferably have inner liners with a thickness at most equal to 1.5 mm. Another feature of these tyres according to the invention is that they have an inner liner thickness that varies by 30% at most from one bead to the other.

Tyres in which part of the carcass layer vertically beneath the central part of the crown is radially on the inside of the points of the carcass layer radially beneath the end of the radially innermost crown layer are somewhat incompatible with the invention. Such crowns exhibit undulations in all of the crown and carcass layers, but with a radial amplitude that is greater than those of the invention, and for aquaplaning or some other purpose. This type of configuration does not meet the geometric definitions of the invention or address the same technical problem. Thus, advantageously, the part of the carcass layer vertically beneath the central part of the tread is radially on the outside of all the points of the carcass layer vertically beneath the ends of the crown layer.

This radial reinforcing element may be either a radial reinforcing layer or else the turned-back strand of the axially innermost carcass layer, or a second carcass layer connecting the two beads, or any other radial reinforcing element. At least one point on this radial reinforcing element needs to be radially on the inside of the radially outermost point of the bead wire, or the radially innermost point of the radial reinforcing element needs to be radially on the inside at a radial distance at most equal to 20 mm from the radially innermost point of the bead wire, and another point of said reinforcing element needs to be radially on the outside of the radially innermost point of the bead wire and at a radial distance at least equal to 40 mm from this point.

The radially outermost crown layer needs to comprise at least one undulation, These undulations have a radial amplitude at least equal to 1 mm, preferably at least equal to 1.5 mm, and preferably at least equal to 2 mm. The greater the radial amplitude of the undulation, the greater the impact on the stiffness of the tyre and the better the performance in terms of rolling resistance, in terms of behaviour, and in terms of grip associated with this architecture. The greater the radial amplitude of these undulations, the more the bending zone needs to be stiffened. Nevertheless, too great a distance db would be detrimental to mass. Thus, a preferred solution is for a radial reinforcing element to constitute a shell with the radially innermost carcass layer, being distant from said carcass layer by an axial thickness db at most equal to 12 mm, preferably at most equal to 8 mm.

If the tyre has an indication as to which way round it should be fitted, namely of one of its sidewalls and is intended to be positioned on the exterior side of a vehicle to which the mounting rim is attached, it is possible to have this shell effect for just one of the beads, namely the one intended to be mounted on the exterior side of the vehicle. This is because it is this sidewall that experiences the highest loading when the vehicle is being used. Thus, it is advantageous that, when one (BE) of the beads is intended to be positioned on the exterior side of a vehicle to which the mounting rim is attached, the bead (BE) intended to be positioned on the exterior side of a vehicle on which the mounting rim is attached comprises a radial reinforcing element and the axial distance between the radial reinforcing element and the carcass layer is at least equal to 1 mm, preferably at least equal to 3 mm, and at most equal to 12 mm at the point of the radial reinforcing element that is situated 30 mm from the radially innermost point of the bead wire.

A preferred solution is for a filler rubber, referred to as bead filler, to be positioned between the axially innermost carcass layer and the radial reinforcing element, and particularly at the bending point, namely at the point on the radial reinforcing element that is situated 30 mm away from the radially innermost point of the bead wire. This bead filler comprises at least one rubber compound having a secant extension modulus MA10 at 10% strain, measured at 23° C. in accordance with standard ASTM D 412 at least equal to 5 MPa, and preferably at least equal to 10 MPa. As a preference, this bead filler has an axial thickness at least equal to 1 mm, preferably at least equal to 3 mm and at most equal to 12 mm, at the point of the radial reinforcing element that is situated 30 mm from the radially innermost point of the bead wire.

As a preference, this bead filler has an axial thickness at least equal to 4 mm and at most equal to 8 mm, at the point of the radial reinforcing element that is situated 30 mm from the radially innermost point of the bead wire.

Advantageously the bead filler is made up of 2 rubber compounds, the first rubber compound being radially on the inside of the second rubber compound, and the first rubber compound having a secant extension modulus MA10 at 10% strain, measured at 23° C. in accordance with standard ASTM D 412 at least equal to the secant extension modulus MA10 at 10% strain, measured at 23° C. in accordance with standard ASTM D 412, of the second rubber compound. This feature means that shear can be better distributed in the filler rubber and also means that different hysteresis values associated with the stiffnesses of the materials can be chosen. The rubber that is stiffest, and often has the highest hysteresis, is positioned beneath the bending point to ensure cohesion in this little-deformed part. At the points corresponding to the bending zone, a more supple material with a lower hysteresis encourages flattening which is favourable to rolling resistance.

One preferred solution for stiffening the bending zone to a greater extent is for at least one bead reinforcement layer, comprising reinforcing elements, making with the radial direction an angle comprised, in terms of absolute value, between 10° and 60°, to be situated between the carcass layer and the radial reinforcing element, particularly at the point on the radial reinforcing element that is situated 30 mm from the radially innermost point of the bead wire. This reinforcer increases the stiffness of the bead and of the sidewall in the circumferential direction with a material that is fibrous and therefore exhibits less hysteresis but more stiffness than the rubber compounds. This architecture is therefore advantageous in terms of the stiffness and the rolling resistance. These reinforcers may be made either of textile or of metal, or may be hybrid.

A preferred solution is for the radially outermost point of the bead filler to be at a distance at least equal to 30 mm from the radially innermost point of the bead wire, preferably at least equal to 45 mm, so as to increase the stiffness in the bending zone.

For reasons connected with tensile strength, endurance, and stiffness, the reinforcing elements of the carcass layer and of the radial reinforcing element are of one of the following types: aliphatic polyamide, aromatic polyamide, combination of aliphatic polyamide and of aromatic polyamide, polyethylene terephthalate or rayon.

As a preference, the carcass layer is a single layer. More preferably, the carcass layer is a single layer and there is just one single radial reinforcing element. This solution makes it possible to obtain a tyre that is lightweight and therefore performs well in terms of mass, and the performance of which is optimal in terms of rolling resistance.

As a preference, for markets that are very demanding in terms of endurance and/or tyres that require high tyre pressures, the carcass reinforcement consists of two carcass layers. More preferably, in this case, the two carcass layers are situated on the same radii for all the points axially on the inside of the axially outermost point of the crown layers and radially on the outside of the axially outermost point of the tyre, so as to reduce the thickness of the crown and therefore the mass and the rolling resistance.

One preferred solution is for the points of the radial reinforcing element that are axially innermost and radially on the outside of the axially outermost point of the tyre to be axially on the inside of the axially outermost points of the crown layers and on the same radius as the reinforcing elements of the radially innermost carcass layer. In that case, the reinforcing elements of the radial reinforcing element, whether or not this is a carcass layer, lines the carcass layer over the entire height of the sidewall at least as far as the axially outermost end of the crown layers, whatever that might be. These points are radially on the outside of the axially outermost point of the tyre because this feature relates to the points near the crown and not in the bead and to which could possibly conform to the first feature. The radial reinforcing element is a carcass layer if it joins the two beads of the tyre. If the radial reinforcing element has an end underneath the crown, then it is not a carcass layer. In addition, the reinforcing elements of the radial reinforcing element are, in the crown, on the same radius as the radially innermost carcass layer, which is to say that they are intercalated, vertically beneath the crown, with the reinforcing elements of the carcass layer. This allows for maximum stiffness while at the same time having a minimum crown thickness, thus maximizing the stiffness and therefore the behaviour, while minimizing mass and rolling resistance.

For the invention to work well, it is necessary for the radially outermost crown layer to have undulations. It is preferable for other crown layers to have undulations with the undulations having substantially the same radial amplitude and the same position as the radially outermost crown layer, so as to keep the thickness of the stack of undulating layers constant over the greatest surface area of these crown layers. That makes it possible to obtain maximum effectiveness from the undulations.

As a preference, all the crown layers have undulations, and their undulations are substantially identical in terms of position and in terms of radial amplitude in their portions situated vertically beneath the central part of the tread, give or take manufacturing variations.

In a conventional architecture comprising a hooping layer, preferably textile, two working layers comprising metal reinforcing elements, the hooping layer being the radially outermost of the crown layers, it is necessary for this hooping layer to be undulating. The performance in terms of rolling resistance, grip or behaviour is better still if the working layer contiguous with the hooping layer is undulating with undulations of the same radial amplitude and same positions at least partially and, better still, over the entirety of the surface of the hooping layer. These same performance aspects are even better still if the two working layers and the hooping layer are undulating with undulations having the same radial amplitude and the same positions. The invention works even if part of the working layer contiguous with the hooping layer is undulating and coupled over these undulations to the hooping layer and another part which is not coupled.

One condition necessary for the invention to work is that the crown layers be at a limited distance from the tread surface, particularly at the radially outermost point of the undulation. Depending on the desired degree of protection for the radially outermost crown layer, the thickness of rubber compound between the radially outermost crown layer and the bottom of the grooves is at least equal to 0.5 and at most equal to 4 mm. it is not a matter of increasing this thickness of rubber compound, but rather of reducing the distance between the surface of the tread when new and the radially outermost point of the undulation. In fact, a sufficient condition is that the radial distance (do) between the radially outer surface (ROS) of the radially outermost crown layer and the tread surface at the undulation be at least 1 mm less than the radial distance (dc) between the radially outer surface (ROS) of the radially outermost crown layer and the tread surface, which distance (dc) is the distance vertically beneath the centre of the bottom face of the circumferential groove closest to the relevant point on said surface. This condition ensures a minimum radial amplitude of the undulation of 1 mm, and ensures that the undulation vertically beneath the ribs or the blocks is indeed intended to reduce the distance between the radially outermost layer and the tread surface in comparison with a tyre that has no undulation.

The radial amplitude of each undulation in a crown layer is measured as being the radial distance between the radially outermost point on the radially outer surface (ROS) of said crown layer vertically beneath the block or the rib concerned and the radially innermost point of the radially outer surface (ROS) of said crown layer vertically beneath the closest circumferential groove. If there are two circumferential grooves equidistant from the radially outermost point of the undulation concerned, the point taken into consideration for calculating the radial amplitude will be the one that yields the highest radial-amplitude value.

The undulations concerned are undulations referred to as central; they are situated in the central part of the tread, which part is centred on the equatorial plane and has a width of 0.8 L, L being the width of the tread surface of the tyre, when new. The width L is measured with the tyre mounted on a nominal rim and inflated to the nominal pressure. The zones of non-coupling between the crown layers in the axially outermost parts of the tyre or shoulder region, outside of the central part, and the objective of which is solely to uncouple the crown layers at their ends in order to avoid cracking of the compounds in this region, are not considered as undulations.

It would appear that undulating 10% of the radially outer surface of the radially outermost crown layer, vertically beneath the central part of the tread, is enough to register an improvement in dynamic performance under transverse load. The radial amplitude of this undulation needs to be at least equal to 1 mm in order to have significant effects on the scale of the tyre. Thus, in the invention, the difference between the radial distance (do) between the radially outer surface (ROS) of the radially outermost working layer and the tread surface is at least 1 mm less than the radial distance (dc) between the radially outer surface (ROS) of the radially outermost working layer and the tread surface, which is the distance vertically beneath the centre of the bottom face of the circumferential groove closest to said undulation, this being over a surface representing at least 10% of said layer.

As a preference, for the part of the crown reinforcement vertically beneath the central part of the tread, over at least 20%, preferably at least 30% and at most 85%, of the radially outer surface (ROS) of the radially outermost crown layer, the radial distance (do) between the radially outer surface (ROS) of the radially outermost crown layer and the tread surface is at least 1.5 mm, preferably at least 2 mm, less than the radial distance (dc) between the radially outer surface (ROS) of the radially outermost crown layer and the tread surface, which is the distance measured vertically beneath the radially innermost point of the bottom face (243) of the circumferential groove closest to said central undulation at the point concerned. The design parameters that make it possible to regulate the dynamic response under significant transverse load, namely load representing at least around 50% of the nominal tyre load, are:

the extent of the undulations of the radially outermost working layer, in the knowledge that the void ratio of the tread pattern, rarely lower than 15%, limits this extent to at most 85% (85%=100%−15%). The more extensive the undulation or undulations, the stiffer the tyre under transverse load, which is the primary effect of the undulations.

The radial amplitude of the undulation is at least equal to 1 mm, but limited to 5 mm because of the radii of curvature that have to be imparted to the crown layers.

A preferred solution is therefore that, over at least 20%, preferably at least 30% and at most 85%, of the radially outer surface (ROS) of the radially outermost working layer, the radial distance (do) between the radially outer surface (ROS) of the radially outermost working layer and the tread surface is at most 5 mm, preferably at most 3 mm, less than the radial distance (dc) between the radially outer surface (ROS) of the radially outermost working layer and the tread surface, which is the distance vertically beneath the centre of the bottom face of the circumferential groove closest to said undulation.

For optimum performance in terms of puncturing and attack of the crown, without penalizing the rolling resistance, the radial distance (d1) between the radially outer surface (ROS) of the radially outermost working layer and the bottom face of the circumferential grooves is at least equal to 0.5 mm and at most equal to 4 mm, preferably at least equal to 0.7 mm and at most equal to 2 mm. Below the lower limits, the tyre may prove too sensitive to attack. Above the upper limits, the rolling resistance of the tyre would be penalized.

It is advantageous for the tread, for example a circumferential groove of the tread, to comprise at least one wear indicator, and for the minimum radial distance (do) between the radially outer surface (ROS) of the radially outermost layer of the crown reinforcement and the tread surface to be at least equal to the radial distance (df) between the tread surface and the radially outermost point of the wear indicator. Specifically, it is important for the user to be able to see that the tyre is worn, using the wear indicator, and to be able to do so before the reinforcing elements of the radially outermost layer of the crown reinforcement begin to appear on the tread surface.

Advantageously, the minimum radial distance (do) between the radially outer surface (ROS) of the radially outermost layer of the crown reinforcement and the tread surface is at most equal to the depth D of the closest circumferential groove plus 2 mm and at least equal to the depth D of the closest circumferential groove minus 2 mm, and preferably substantially equal to the depth D of the closest circumferential groove. This solution allows ideal positioning of the radially outermost layer of reinforcing elements of the crown reinforcement and the tread surface. The minimum radial distance (do) between the radially outer surface (ROS) of the radially outermost layer of the crown reinforcement and the tread surface has to be measured over the radially exterior portion of the crown reinforcement, and therefore at an undulation.

Preferably, the depth D of a circumferential groove (24) is at least equal to 5 mm and at most equal to 10 mm. Tread depths of between 6 and 10 mm allow a good compromise between wearing and rolling resistance performance aspects in many passenger vehicle tyres.

In instances in which the radially outermost layer of reinforcing elements is a hooping layer, it is advantageous for the radially outermost layer of reinforcing elements in the crown reinforcement to comprise reinforcing elements made of textile, preferably of the aliphatic polyamide, aromatic polyamide type, of a type involving a combination of aliphatic polyamide and aromatic polyamide, of polyethylene terephthalate or of rayon type, which are mutually parallel and form an angle B at most equal to 10°, in terms of absolute value, with the circumferential direction (XX') of the tyre.

One preferred solution is for at least one filling rubber, having a radial thickness at least equal to 0.3 mm, to be positioned vertically beneath each central undulation of the radially outermost crown layer and preferably radially on the outside of the carcass layer, preferably radially on the inside of the radially innermost working layer. The purpose of this is to allow the plies to undulate during building and curing. These filling rubber compounds may be present around the entire circumference of the tyre or be disposed in certain portions of the tyre, as required. It is possible to lay several filling rubbers vertically beneath the one or more undulations at different radius values having different properties dependent on the tyre specification sheet. If just one filling rubber is laid, its maximum thickness is approximately equal, for a given undulation, to the radial amplitude of said undulation.

With the tread being made up of a rubber compound, it is advantageous for the filling rubber, laid vertically beneath the undulation or undulations, to be a rubber compound that has a dynamic loss tan δ1, measured at a temperature of 10° C. and under a stress of 0.7 MPa at 10 Hz, at most equal to and preferably 30% less than the dynamic loss tan δ2 of the rubber material or materials of which the tread is made, measured at a temperature of 10° C. and under a stress of 0.7 MPa at 10 Hz. For a filling material with the same hysteresis, the improvement in terms of rolling resistance is achieved only by the reduction in the shear stress loadings that this material experiences. Because the filling material does not experience the same stresses as the rubber material of which the tread is made, it is possible to modify its characteristics in order to improve the rolling resistance still further. A 30% drop in hysteresis leads to a significantly greater improvement for the invention.

It is preferable for the crown reinforcement to consist of 2 working plies of opposite angles and one hooping ply, as in numerous present-day crown architectures.

In order to measure the various geometric magnitudes, including the radial amplitudes of the undulations and the extent of the undulations, it is commonplace for those skilled in the art to take measurements on sections of a tyre taken in meridian planes, or meridian sections. In order to achieve greater precision, these measurements may be the mean of 4 measurements taken on 4 meridian planes situated 90° apart, the tyre sections being polished in order to reveal the interfaces between the various compounds that make up the tyre. Because the tyre is toric, measurements of the extent of a surface of an undulation is equivalent to measurements of length on a meridian section. For example, a check will be made, on a meridian section, to ensure that, over 10% of the length of the radially outermost crown layer in the central part of the tread, the radial distance between the radially outer surface of the radially outermost crown layer and the tread surface at the undulation or undulations is at least 1 mm less than the radial distance between the radially outer surface (ROS) of the radially outermost crown layer and the tread surface, which distance is the distance vertically beneath the bottom face of the circumferential groove closest to the relevant point on said surface.

BRIEF DESCRIPTION OF THE DRAWINGS

The features and other advantages of the invention will be understood better with the aid of FIGS. 1 to 9, said figures not being drawn to scale but in a simplified manner so as to make it easier to understand the invention:

FIG. 1 shows a meridian half-section through the crown of a tyre according to the invention, having undulations. It illustrates the radial amplitude A of an undulation (51) of the radially outermost crown layer 5, the various radial distances do, d1, D, df, dc and a filler material, referred to as crown filler (6) suitable for creating an undulation, notably in the radially outermost crown layer.

FIGS. 2 to 9 depict nonlimiting examples of the beads and sidewall according to the invention.

A meridian section through the tyre is obtained by cutting the tyre on two meridian planes. This section is used to determine the various radial and axial distances mentioned.

Figures 1, 2, 3:
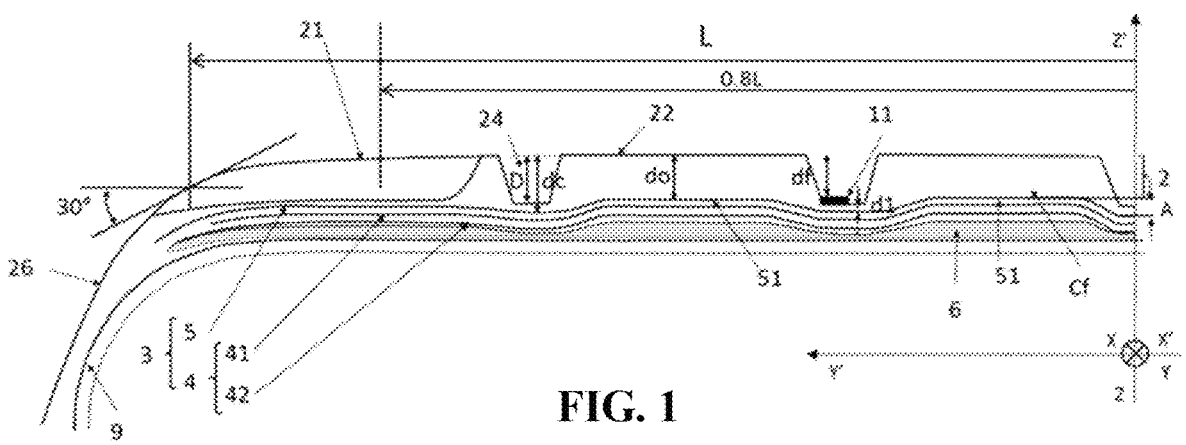

FIG. 1 depicts a portion of the crown of a tyre. It depicts a carcass layer 9, radially on the inside of the crown layer 3, comprising a working reinforcement 4 comprising, in this instance, two working layers 41 and 42, made up of reinforcing elements which are at least partially metallic, coated with an elastomeric material, parallel to one another and which make, with the circumferential direction (XX') of the tyre, an oriented angle of which the absolute value is at least equal to 15° and at most equal to 50°, and a hooping layer 5. The tyre also comprises a tread 2, delimited by the tread surface 21 and the exterior lateral surfaces 26 and comprising cuts, which in this instance include two circumferential grooves 24 having widths at least equal to 6 mm. A circumferential groove may be made of a succession of cuts making a non-zero angle with the direction XX' and connected to one another in such a way as to form a cut that is continuous over the entire circumference of the tyre.

FIG. 1 shows how the width L of the tread is determined. The width L of the tread is determined on a tyre, mounted on a nominal rim and inflated to the nominal pressure. In the event of an obvious boundary between the tread surface and the rest of the tyre, the width of the tread is easily determined as a trivial matter by a person skilled in the art If the tread surface 21 is continuous with the exterior lateral surface 26 of the tyre, the axial limit of the tread passes through the point at which the angle between the tangent to the tread surface 21 and an axial direction YY' is equal to 30°. When, in a meridian plane, there are several points for which said angle is equal to 30°, it is the radially outermost point that is adopted. The width of the tread is equal to the axial distance between the two axial limits of the tread surface on either side of the equatorial plane.

FIG. 1 in particular illustrates undulations of all the layers of the crown reinforcement (3), including the working layers (41, 42) and the radially outermost crown layer (5) using a filler material (6) positioned between the carcass layer (9) and the radially innermost working layer (42). This filler material causes all of the crown layers 41, 42, 5 to undulate and therefore creates an undulation 51 in the hooping layer 5 that is the radially outermost of the crown layers.

FIG. 1 also illustrates the following radial distances:

D: the depth of a circumferential groove (24), which is the maximum radial distance between the tread surface (21) and the bottom face of the groove (not including retreading wells), dc: the radial distance between the radially outer surface (ROS) of the radially outermost crown layer (5) and the tread surface (21), which is the distance vertically beneath the radially innermost point of the bottom face of the circumferential groove (24), do: the radial distance between the radially outer surface (ROS) of the radially outermost crown layer (5) and the tread surface (21) at the undulation (51), d1: the minimum distance (d1) between the radially outer surface (ROS) of the radially outermost crown layer (5) of the crown reinforcement (3) and the bottom face of the circumferential grooves (24), df: the radial distance between the tread surface (21) and the radially outermost point of the wear indicator (11), A: the radial amplitude of the undulation measured for a given undulation between the radially outermost point of said undulation and the radially innermost point situated vertically beneath the closest circumferential groove 24.

FIG. 2 depicts the beads and sidewalls of the same tyre, the asymmetry of which is connected with the direction of rotation of the tyre. The bead BE is positioned on the exterior side of the vehicle and the bead BI is positioned on the interior side of the vehicle. Special markings on the sidewall of the tyre allow the user to position the tyre correctly. The exterior bead needs to be stiffened because it is liable to be the most highly stressed under the most stress-inducing conditions, namely under high-speed cornering at the limits of grip of the tyre. Under such circumstances, the overload and the deformation are the greatest on the tyre that is on the exterior side of the vehicle and on the vehicle-exterior side of the tyre. Stiffening both beads may be beneficial in terms of behaviour, but this will come at a cost in terms of rolling resistance. In FIG. 2, the beads BE, BI comprise, aside from the carcass layer 9, a radial reinforcing element 95, possibly a second carcass layer, and a bead wire 92, in this instance of multi-linear cross section, therefore made up of at least two windings of elementary metal wires that are substantially parallel to at least one carcass layer. Only the exterior bead is such that the radial reinforcing element 95 is at a radial distance db at least equal to 1 mm and at most equal to 12 mm, at the point of the radial reinforcing element that is situated 30 mm from the radially innermost point of the bead wire, so as to generate a beam effect stiffening this bead. For tyres the sidewalls of which do not indicate a preferred direction of mounting, both of the beads would have the aforementioned feature present in the exterior bead (BE). The solution depicted shows a rubber compound, or filling rubber, referred to as bead filler 97, positioned between the carcass layer and the radial reinforcing element.

The bead BI is a standard bead that is optimized if it is associated with a crown having no undulations in its crown layers. It notably performs well in terms of rolling resistance, because shearing between the carcass layer 9 and the carcass reinforcing element 95 is practically nil in bending.

FIGS. 3 to 9 illustrate variants of the beads according to the invention, entirely nonlimitingly.

FIG. 3 depicts a bead with a multi-linear bead wire having three windings of elementary metal wires substantially parallel to at least one carcass layer, the carcass layer 9, the radial reinforcing element 95 which in this instance is possibly a second carcass layer.

FIG. 4 illustrates a bead in which the bead wire is a bead wire with a polygonal cross section and the radial reinforcing element 95 is made up of the turned-back strand of the carcass layer. The bead filler is made up of two filler rubbers 971 and 972. The first rubber compound 971 is radially on the inside of the second rubber compound 972, and the first rubber compound 971 has a secant extension modulus MA10 at 10% strain, measured at 23° C. in accordance with standard ASTM D 412 at least equal to the secant extension modulus MA10 at 10% strain, measured at 23° C. in accordance with standard ASTM D 412, of the second rubber compound 972. These two features are combined only for the purposes of illustration. For example, the feature whereby there are two different rubber compounds may be associated with bead wires that are multi-linear.

FIG. 5 illustrates a bead in which the bead wire is a bead wire with a polygonal cross section and the radial reinforcing element 95 is made up of the turned-back strand of the carcass layer with a second carcass layer 91.

FIG. 6 is a variant of FIG. 5, in which the carcass turned-back strand is in intimate contact with the carcass layer 9. In this configuration, since the second carcass layer 95 is also a carcass reinforcing element, the essential feature of the invention is present.

FIG. 7 is a variant in which, since the carcass turned-back strand is too short, it is the second carcass layer that is the carcass reinforcing element used to stiffen the bead by creating a beam effect. The bead according to FIG. 7 also comprises a bead reinforcing layer 96. This bead reinforcing layer comprises reinforcing elements, making with the radial direction an angle which in terms of absolute value is comprised between 10° and 60°. These reinforcing elements are situated between the carcass layer and the radial reinforcing element, particularly at the point on the radial reinforcing element that is situated 30 mm from the radially innermost point of the bead wire.

Figure 8:
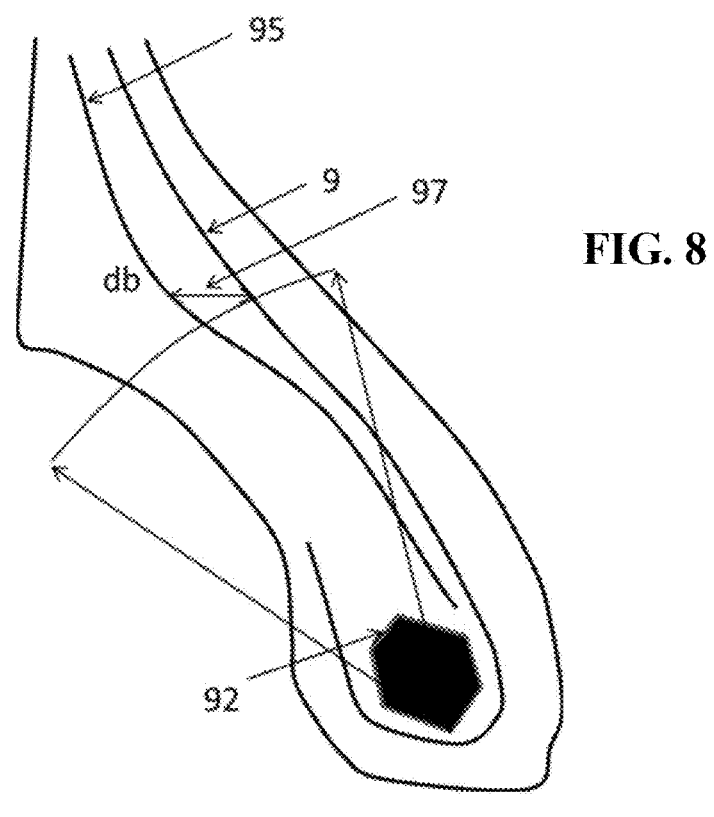

FIG. 8 is a variant of FIG. 7 in which the second carcass layer is the radial reinforcing element 95 and is in intimate contact with the radially innermost carcass layer 9 on its interior part but satisfies the feature of the invention in the bending zone where stiffness is needed.

Figure 9:
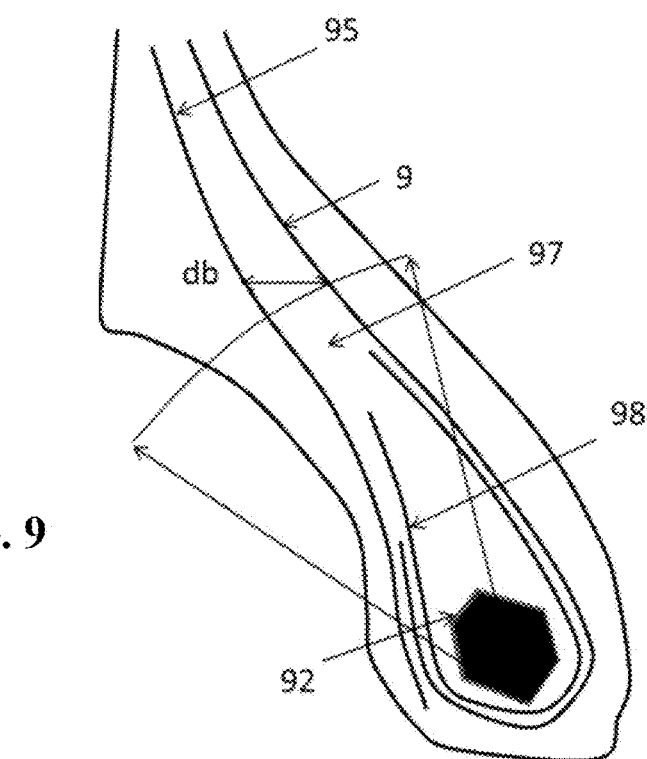

FIG. 9 is another variant nonlimitingly illustrating the possibility of the bead comprising other types of reinforcer, here by way of example a textile reinforcer 98 in intimate contact with the carcass layer 9 in the lower part of the bead near the bead wire so as to improve the performance of the tyre in terms of the peeling of the carcass layer in the event of excessive brake temperature.

Tests were conducted in order to compare various solutions:

Tyres of type A, the beads of which each comprise two multi-linear bead wires clamping within the bead a single carcass layer. The crown layers of these tyres have no undulations. They are referred to in Table 1 as flat crown, soft bead.

Tyres of type B, the beads of which comprise three multi-linear bead wires clamping within the bead two carcass layers as illustrated in FIG. 3. These beads are stiffened in comparison with the beads of the tyres of type A, by the insertion of a bead filler 97 positioned between the carcass layer and the radial reinforcing element, having an axial thickness equal to 5 mm. It is made up of a rubber compound having a secant extension modulus MA10 at 10% strain, measured at 23° C. in accordance with standard ASTM D 412 equal to 7 MPa. The crown layers of these tyres have no undulations. They are referred to in Table 1 as flat crown, stiff bead.

Tyres of type C, the beads of which are identical to the beads of the tyres of type A, soft, and the crown layers of which have undulations. They are referred to in Table 1 as undulating crown, soft bead.

Tyres of type D according to the invention, the beads of which are identical to the stiff beads of the tyres of type B, and the crown layers of which have undulations. They are referred to in Table 1 as undulating crown, stiff bead.

The tyres of types A, B, C, D are available in 1 single size 305/30R20 intended to be fitted to the driven rear axleset of a passenger vehicle. The tyres of the front axleset of the vehicle are identical in the behaviour tests. They are not a variable of the experiment.

The various components of the tyres A, B, C, D are identical in terms of nature and properties. The architecture, the properties of the reinforcing elements of the various reinforcing layers and the density thereof are identical. The rubber compounds for the various parts of the tyres are also identical with the exception of the bead filler (97) which is present only in tyres B and D and the crown fillers (6) capable of creating undulations in the crown layers, which are present only in tyres C and D.

The tread patterns for tyres A, B, C, D are identical. The depths D of the grooves of the tread pattern are between 5 mm at the shoulders and 7 mm at the equator, for widths W that vary between 4 and 15 mm, the tread containing 4 circumferential grooves. The crown reinforcement is made up of two working layers, the reinforcing elements of which make an angle of + or −38° with the circumferential direction, and of a textile hooping layer, the reinforcing elements of which make an angle of near 0° with the circumferential direction.

For tyres of type C and D, the radially outermost crown layer, the hooping layer 5, is undulated under the 5 ribs of the tread, making up more than 50% of its surface area. The undulations are made with the aid of crown filling rubbers (6) radially on the inside of the radially innermost working layer, said filling rubbers being situated more specifically between the carcass layer and the radially innermost crown layer. The undulations have radial amplitudes of 2 mm, meaning that the radial distances (du) between the radially outer surface (ROS) of the radially outermost crown layer (5) and the tread surface at the undulations (51) are 2 mm less than the radial distances (dc) between the radially outer surface (ROS) of the radially outermost crown layer (5) and the tread surface (21), these being the distances vertically beneath the radially innermost point of the bottom face of the circumferential grooves (24) closest to said undulations (51). The radial distance (d1) between the radially outer surface (ROS) of the radially outermost crown layer (5) and the bottom face of the circumferential grooves (24) is equal to 1.5 mm.

The tyres were tested for rolling resistance and to assess behaviour, in terms of response time and subjective damping.

The improvement of the invention in terms of rolling resistance was evaluated on a standard machine for measurements standardized in accordance with ISO 2850:2009.

The response time was tested on a vehicle (Ferrari 488 GTB) by a professional driver trained for this test, on a straight of a motor racing circuit at a speed of 140 km/h. The driver applies a determined amount of steering lock in a very short given time and assesses the time lag between the steering wheel input and the lateral acceleration of the vehicle thus generated. The shorter the time lag, the better the performance. The measurement may also be conducted using accelerometers.

The same measurements can be used to evaluate the damping, which is assessed subjectively by the driver who assesses the amplitude of the first oscillation, the number of oscillations, the time taken for the driver to stop perceiving oscillations about the intended path as a result of the step steering input the driver has applied. Good damping performance is associated with a low-amplitude first oscillation, a low number of oscillations felt, and a short time needed to stop perceiving the oscillations. These criteria are weighted on a score chart dependent on the vehicle and on the associated features that the manufacturer of said vehicle wishes to offer.

TABLE 1

| Tyre | Crown | Bead | Response time | Subjective damping | Rolling resistance |
|---|---|---|---|---|---|
| A | flat | soft | 100 | 100 | 100 |
| B | flat | stiff | 102 | 109 | 94 |
| C | undulating | soft | 108 | 92 | 110 |
| D invention | undulating | stiff | 110 | 101 | 104 |

Table 1 gives the performance of the tyres according to the various tests. Any performance higher than 100 is better than the performance of control tyre A considered by the manufacturer to be a reference.

By only stiffening the bead and keeping the crown flat, tyre B is substantially equivalent to the control in terms of the response time which is essentially associated with the working of the crown. It is 9% better in damping because of the stiffness of the bead. However, the increase in bead thickness leads to a 6% drop-off in terms of rolling resistance.

By only undulating the crown layers and keeping a soft bead, tyre C is 8% better in comparison with the control A in terms of response time. Tyre C is 8% worse in damping, because the interaction between the undulating crown and the bead leads to impaired performance. The undulating crown leads to a 10% improvement in rolling resistance.

By undulating the crown layers and combining this with a stiff bead, tyre D according to the invention is 10% better in comparison with the control A in terms of response time. Tyre D is substantially equivalent to the control in terms of subjective damping, thanks to the interaction between the undulating crown and the stiff bead. The undulating crown provides a 4% improvement in rolling resistance, in spite of the bead thickness having been increased in comparison with the control A.

Thus, only tyre D according to the invention provides an uncompromised improvement in performance over the control tyre A.

The invention claimed is:

1. A tire comprising:
a crown comprising:
a tread intended to come into contact with the ground via its tread surface having an axial width L, the tread comprising a tread central part having a width equal to 0.8*L, the tread central part comprising at least two circumferential grooves; and
a crown reinforcement, radially on an inside of the tread, comprising at least one crown layer, each crown layer of the at least one crown layer being a layer of reinforcing elements, the crown reinforcement including a working reinforcement comprising at least one working crown layer, the reinforcing elements of each working crown layer being at least partially metallic, coated with an elastomeric material, and parallel to one another, and making, with a circumferential direction of the tire, an oriented angle of which an absolute value is at least equal to 15° and at most equal to 50°, each crown layer of the at least one crown layer extending radially from a radially inner surface to a radially outer surface, a radially outermost crown layer vertically beneath the tread central part comprising at least one central undulation, with a radial amplitude A at least equal to 1 mm, each at least one central undulation of the radially outermost crown layer being such that the portion of a radially outer surface of the radially outermost crown layer in the central undulation is radially outside of those points of the radially outermost crown layer vertically beneath the bottom face of a circumferential groove closest to the central undulation;
two beads intended to come into contact with a rim and two sidewalls connecting the crown to the beads, each bead having at least one bead wire comprising circumferential metal reinforcing elements, wherein each bead of the two beads comprises a radial reinforcing element;
at least one carcass layer including an axially innermost carcass layer, the at least one carcass layer being radially inside of the crown reinforcement layer and connecting the two beads, the axially innermost carcass layer comprising textile reinforcing elements coated in an elastomeric material, the textile reinforcing elements being nonmetallic, being parallel to one another, and making, with a radial direction of the tire, an angle of which an absolute value is at most equal to 15°; and
a bead filler rubber, for each bead of the two beads, positioned between the carcass layer and the radial reinforcing element of each bead of the two beads, the radial reinforcing element of each bead of the two beads comprising textile reinforcing elements coated in an elastomeric material, the textile reinforcing elements being nonmetallic, being parallel to one another, and making, with the radial direction of the tire, an angle of which an absolute value is at most equal to 15°, in each bead of the two beads a radially innermost point of the radial reinforcing element being at a radial distance at most equal to 20 mm from a radially innermost point of the at least one bead wire, and in each bead of the two beads a point of the radial reinforcing element being radially outside of, and at a radial distance at least equal to 40 mm from, the radially innermost point of the at least one bead wire, wherein an axial distance between the radial reinforcing element of each bead of the two beads and the axially innermost carcass layer is at least equal to 1 mm and at most equal to 12 mm at the point of the radial reinforcing element that is situated 30 mm from the radially innermost point of the at least one bead wire, wherein the bead filler rubber, for each bead of the two beads, has an axial thickness at least equal to 1 mm at the point of the radial reinforcing element that is situated 30 mm from the radially innermost point of the at least one bead wire, and wherein the bead filler rubber, for each bead of the two beads, comprises at least one rubber compound having a secant extension modulus MA10 at 10% strain, measured at 23° C. in accordance with standard ASTM D 412 at least equal to 5 MPa.

2. The tire according to claim 1, wherein one of the two beads is intended to be positioned on an exterior side of a vehicle to which the rim is attached, and, in the one of the two beads, the axial distance between the radial reinforcing element and the axially innermost carcass layer is at least equal to 3 mm and at most equal to 12 mm at the point of the radial reinforcing element that is situated 30 mm from the radially innermost point of the at least one bead wire.

3. The tire according to claim 1, wherein the at least one rubber compound is two rubber compounds, a first rubber compound of the two rubber compounds being radially on an inside of a second rubber compound of the two rubber compounds, and the first rubber compound having a secant extension modulus MA10 at 10% strain, measured at 23° C. in accordance with standard ASTM D 412 at least equal to the secant extension modulus MA10 at 10% strain, measured at 23° C. in accordance with standard ASTM D 412, of the second rubber compound.

4. The tire according to claim 1, wherein each bead of the two beads includes at least one bead reinforcement layer, comprising reinforcing elements, making with the radial direction, an angle comprised, in terms of absolute value, between 10° and 60°, and being situated between the axially innermost carcass layer and the radial reinforcing element.

5. The tire according to claim 1, wherein the radial reinforcing element of each bead of the two beads is made up of a turned-back strand of the axially innermost carcass layer.

6. The tire according to claim 1, wherein axially innermost points of the radial reinforcing element of each bead of the two beads are axially on an inside of a respective axially outermost point of the at least one crown layer and on a same radius as the reinforcing elements of a radially innermost carcass layer of the at least one carcass layer.

7. The tire according to claim 1, wherein the radial reinforcing element is a second carcass layer connecting the two beads, the second carcass layer comprising nonmetallic textile reinforcing elements coated in an elastomeric material, which are parallel to one another and make, with a radial direction of the tire, an angle of which an absolute value is at most equal to 15°.

8. The tire according to claim 7, wherein the two carcass layers are situated on a same radii for all points axially on an inside of axially outermost points of the at least one crown layer and radially on an outside of axially outermost points of the tire.

9. The tire according to claim 1, wherein the at least one central undulation of the radially outermost crown layer is such that, over at least 10% of the radially outer surface of the radially outermost crown layer vertically beneath the tread central part, a radial distance between the radially outer surface of the radially outermost crown layer and the tread surface at each at least one central undulation is at least 1 mm less than a radial distance between the radially outer surface of the radially outermost crown layer and the tread surface vertically beneath the bottom face of a circumferential groove closest to the respective central undulation.

10. The tire according to claim 1, wherein the part of the axially innermost carcass layer vertically beneath the tread central part is radially outside of all the points of the axially innermost carcass layer vertically beneath axial ends of the at least one crown layer.

11. The tire according to claim 1, wherein a minimum radial distance between the radially outer surface of the radially outermost crown layer and the tread surface is at most equal to a depth D of the circumferential groove closest to the at least one central undulation plus 2 mm and at least equal to the depth D of the circumferential groove closest to the at least one central undulation minus 2 mm.

* * * * *